(12) United States Patent
Hanson

(10) Patent No.: US 8,650,893 B2
(45) Date of Patent: *Feb. 18, 2014

(54) AIR CONDITIONING SYSTEM WITH VARIABLE CONDENSER REHEAT AND REFRIGERANT FLOW SEQUENCER

(75) Inventor: Oved Hanson, Carrollton, TX (US)

(73) Assignee: Lennox Industries Inc., Richardson, TX (US)

( * ) Notice: Subject to any disclaimer, the term of this patent is extended or adjusted under 35 U.S.C. 154(b) by 305 days.

This patent is subject to a terminal disclaimer.

(21) Appl. No.: 12/888,952

(22) Filed: Sep. 23, 2010

(65) Prior Publication Data

US 2011/0232319 A1  Sep. 29, 2011

Related U.S. Application Data

(63) Continuation of application No. 11/611,455, filed on Dec. 15, 2006, now Pat. No. 7,823,404.

(51) Int. Cl.
*F25B 41/04* (2006.01)
*F25B 41/06* (2006.01)

(52) U.S. Cl.
CPC .................................. *F25B 41/06* (2013.01)
USPC ........................................ 62/222; 62/324.1

(58) Field of Classification Search
CPC ... F16K 17/0486; F16K 17/083; F16K 15/21; F16K 31/406; F15K 15/02
USPC ............... 62/117, 125, 160, 176.6, 197, 207, 62/216–218, 222, 228.4, 227, 229, 324.1, 62/324.6, 511, 527; 137/68.22, 493, 137/513.5, 515, 515.5, 516.19, 533.11, 137/533.15, 519.5, 625.29, 469
See application file for complete search history.

(56) References Cited

U.S. PATENT DOCUMENTS

| | | | |
|---|---|---|---|
| 2,929,401 A | 3/1960 | Cowan | |
| 2,930,401 A * | 3/1960 | Cowan | 137/540 |
| 4,803,848 A | 2/1989 | LaBrecque | |
| 4,873,838 A | 10/1989 | Voorhis et al. | |
| 4,896,690 A | 1/1990 | Taylor | |
| 4,920,756 A | 5/1990 | Howland et al. | |
| 5,174,327 A * | 12/1992 | Truax et al. | 137/469 |
| 5,231,845 A | 8/1993 | Sumitani et al. | |
| 5,305,822 A | 4/1994 | Kogetsu et al. | |
| 5,320,135 A | 6/1994 | Pierrou | |
| 5,495,865 A | 3/1996 | Wass et al. | |
| 5,605,051 A | 2/1997 | Iritani et al. | |
| 5,634,348 A | 6/1997 | Ikeda et al. | |
| 5,651,258 A | 7/1997 | Harris | |
| 5,680,711 A | 10/1997 | Moratalla | |
| 5,685,162 A | 11/1997 | Iritani et al. | |
| 5,704,391 A * | 1/1998 | McGowan et al. | 137/454.2 |
| 5,953,926 A | 9/1999 | Dressler et al. | |
| 6,102,075 A | 8/2000 | Phillips | |
| 6,105,666 A | 8/2000 | Tajima et al. | |
| 6,543,241 B2 * | 4/2003 | Levitin et al. | 62/222 |
| 6,612,119 B2 | 9/2003 | Eber et al. | |

(Continued)

*Primary Examiner* — Alexandra Elve
*Assistant Examiner* — Emmanuel Duke

(57) ABSTRACT

A vapor-compression air conditioning system comprising a blower positioned in a return air flow path from a conditioned space, a reheat heat exchanger positioned in the return air flow path and downstream from the blower, a system reversing valve fluidly coupled to the reheat heat exchanger, and a refrigerant flow sequencer interposed the system reversing valve and the reheat heat exchanger. A method of manufacturing an air conditioning system is also provided.

18 Claims, 4 Drawing Sheets

(56) References Cited

U.S. PATENT DOCUMENTS

| | | |
|---|---|---|
| 6,666,040 B1 | 12/2003 | Groenewold et al. |
| 6,826,921 B1 * | 12/2004 | Uselton .................. 62/176.6 |
| 6,923,638 B2 | 8/2005 | Chen |
| 6,931,868 B1 | 8/2005 | Goldstein |
| 7,823,404 B2 * | 11/2010 | Hanson .................. 62/324.1 |
| 2006/0053823 A1 * | 3/2006 | Taras et al. .................. 62/324.1 |

* cited by examiner

AIR CONDITIONING SYSTEM WITH VARIABLE CONDENSER REHEAT AND REFRIGERANT FLOW SEQUENCER

REFERENCE TO RELATED APPLICATIONS

The present application is a continuation of U.S. patent application Ser. No. 11/611,455 entitled "AIR CONDITIONING SYSTEM WITH VARIABLE CONDENSER REHEAT AND REFRIGERANT FLOW SEQUENCER" filed on Dec. 15, 2006, by Oved Hanson, which is currently pending. The above-mentioned application is commonly assigned with the present application and incorporated herein by reference in its entirety.

TECHNICAL FIELD

The present invention is directed, in general, to air conditioning systems and, more particularly, to an enhancement to air conditioning systems with variable condenser reheat.

BACKGROUND

Vapor compression type air conditioning systems are well known and widely used for controlling temperature in residential and commercial applications. In addition to the sensible temperature within the space controlled by a vapor compression type air conditioning system, it is usually desirable to also control the absolute and relative humidity to enhance the comfort of occupants of the space or to meet other requirements of temperature and humidity within the space.

A type of vapor compression air conditioning system has been developed wherein an additional heat exchanger is placed in the supply air flowpath which furnishes conditioned air to the space being controlled so that, in addition to cooling the supply air to reduce the absolute humidity, the supply air is then reheated to a desired temperature for comfort; and wherein the relative humidity is then also reduced for comfort and for meeting certain other requirements of the controlled space. However, some heat pump systems with enhanced dehumidification have a refrigerant fluid bypass from the liquid line to the suction line. This is necessitated by the need to return refrigerant from inactive components to the active flow path, and because of the slow transition time of a heat exchanger control valve actuator, may result in compressor flooding.

With regard to heat pump systems, it is also known that pressure and temperature conditions could be established in the system during the heating mode that make it possible for refrigerant to migrate to the charge reservoir and to the reheat coil. This condition results in the system behaving as though it is undercharged during the heating mode.

An explanation of the operation of a heat pump system in these modes will better explain the problems encountered. Referring initially to FIG. 1, illustrated is a conventional vapor-compression type air conditioning system 100 with enhanced dehumidification accessory as disclosed in U.S. Pat. No. 6,826,921. The vapor-compression type air conditioning system 100 is also operable in a reverse or so-called heat pump mode. Dashed line 60 divides the outdoor components of the system (left side of FIG. 1) from the indoor components (right side of FIG. 1) for conditioning air within a space 32. The outdoor part of the system 100 includes a motor driven compressor 132 operably connected to a remotely controllable system reversing valve 136. A condenser heat exchanger 138 is operably connected to system reversing valve 136 via a conduit 140 for receiving high pressure refrigerant fluid from compressor 132 by way of reversing valve 136 when valve 136 is in position X, as shown. Condensed high pressure fluid flows via a conduit 142 to a conduit 144 leading to a first motor operated valve 146.

A conventional arrangement for heat pumps of an expansion device 150 in series with a filter/dryer 147 is employed. A check valve 148 is in parallel with expansion device 150 and filter/dryer 147. The check valve 148, expansion device 150 and filter/dryer 147 are interposed heat exchanger 138 and conduit 142. In like manner a conventional arrangement of an expansion device 154, a filter/dryer 157 and a check valve 156 are operable to be connected to conduit 144 via valve 146. An indoor heat exchanger or evaporator 158 receives refrigerant fluid from the conduit 144 and valve 146 through expansion device 154 whereby cooling effect of air being pumped by a blower 160 to the conditioned space 32 is provided as heat exchange takes place through the heat exchanger 158. Heat exchanger 158, as well as a reheat heat exchanger 162, may be disposed in suitable ductwork 174 for conducting return air from blower 160 to supply conditioned space 32. For normal operations, return air to the heat exchanger or evaporator 158 is drawn from conditioned space 32 through a return duct 173 by blower 160. Refrigerant fluid exiting the evaporator heat exchanger 158 flows through a conduit 164 to the reversing valve 136. The air conditioning system 100 further comprises a refrigerant fluid charge compensator 180 interposed conduit 164 and conduit 166, and is further coupled to a branch conduit 182. Conduit 182 is connected to the refrigerant fluid path comprising that portion of conduit 175 between the heat exchanger 162 and a second motor-controlled valve 170. Charge compensator 180 comprises a closed heat exchanger vessel which is configured to store refrigerant fluid, generally in liquid form, under certain operating conditions wherein an excess refrigerant fluid charge in the system 100 would otherwise adversely affect the operation thereof. In the normal cooling mode as illustrated in FIG. 1, refrigerant flows through conduit 164 and the charge compensator 180 to the reversing valve 136. The position X of the reversing valve 136 in the normal cooling mode of the space 32 causes refrigerant fluid in vapor form to flow through conduit 166 from valve 136 to the compressor 132. As mentioned previously, compressed refrigerant fluid discharged from the compressor 132 flows through valve 136 to conduit 140 to complete a circuit.

The second motor-controlled valve 170 is operably connected to: conduit 164 after the charge compensator 180, conduit 175, and the reheat heat exchanger 162, as shown. Furthermore, the system 100 may include a bypass conduit 172 and pressure relief valve 174 for bypassing fluid around heat exchanger 138 from conduit 140 to conduit 142. Heat exchange takes place at the heat exchanger or condenser 138 by flow of ambient outdoor air through the heat exchanger 138 as propelled by a variable speed motor-driven fan including fan blade or propeller 184 drivingly connected to a variable speed motor 183. A controller 186 receives signals from humidity sensor 30 and temperature sensor 34 within conditioned space 32 for controlling compressor 132, fan motor 183, and a motor 161 for driving blower 160. Controller 186 also controls the positions of the valves 146 and 170. Valve 146 is operable to conduct refrigerant fluid from conduits 142, 144, in turn to expansion device 154 and heat exchanger 158. Valve 146 is also operable to conduct fluid from conduits 142, 144, in turn, via a conduit 143 directly to reheat heat exchanger 162 which is located downstream with respect to the direction of airflow or supply air from blower 160 to space 32, as indicated by the arrow 171 in FIG. 1. Valve 170 is operable to communicate fluid from heat exchanger 162 to conduit 164 or to conduit 175 which, as shown, is connected to conduit 144 between valve 146 and expansion device 154. The operation of valves 146 and 170 will be discussed below.

In operation of the system 100 for providing cooled, conditioned air to the space 32, the controller 186 will call for operation of the compressor 132, the blower motor 161, and the fan motor 183 to operate the system 100 in the normal cooling mode, that is with high pressure refrigerant vapor being discharged from compressor 132 to flow through condenser heat exchanger 138 and check valve 148; then through conduits 142, 144, valve 146 and dryer 157; then through expansion device 154, and through heat exchanger 158 to absorb heat from air being blown through the heat exchanger by blower 160. Valve 146 is in the position shown in FIG. 1 and valve 170 is in the position shown, which essentially isolates heat exchanger 162 since no refrigerant fluid flow occurs therethrough. Low pressure refrigerant fluid in vapor form is returned to compressor 132 via conduit 164, reversing valve 136 and conduit 166.

With the system 100 in the cooling mode, as shown in FIG. 1, valve 146 directs all refrigerant fluid flow to the expansion device 154 and the heat exchanger 158 and with the valve 136 in position X to allow flow of fluid through conduit 164 to the inlet or suction side of compressor 132, the compressor will also withdraw liquid refrigerant from the heat exchanger 162 while it is inactive, thanks to the position of valve 170 shown.

Referring now to FIG. 2, illustrated is the conventional heat pump system of FIG. 1 in cooling mode with enhanced dehumidification engaged as disclosed in U.S. Pat. No. 6,826,921. Compressor 132 still delivers high pressure refrigerant fluid vapor to condenser heat exchanger 138 since valve 136 remains in position X. Partially condensed refrigerant fluid flows from heat exchanger 138 through conduits 142, 144 and valve 146, now in a position to conduct refrigerant fluid, partially or completely condensed, through heat exchanger 162 to exchange heat with air flowing to the space 32 via the blower 160 and the heat exchanger 158. Further cooled refrigerant fluid flows through valve 170, in its position as shown, and through conduit 175, dryer 157 and expansion device 154 before absorbing heat from air flowing through heat exchanger or evaporator 158. As controller 186 receives signals from the humidity sensor 30 requiring even lower relative humidity the fan motor 183 is operable to reduce the speed of fan 184 to reduce the heat exchange taking place at condenser heat exchanger 138 and places a greater condensing burden on the heat exchanger 162.

When the valves 146 and 170 are positioned as shown in FIG. 2, partially condensed refrigerant fluid from the heat exchanger 138 flows through heat exchanger 162 before going through the expansion device 154 and evaporator or heat exchanger 158. The controller 186 is operable to reduce the speed of fan motor 183, as required by the sensor 30, to a point where there is no longer complete condensation of refrigerant fluid in the heat exchanger 138. Pressure relief valve 174 will allow bypass of compressor discharge gas around the heat exchanger 138 when a pressure differential across the heat exchanger 138 exceeds a predetermined level. Accordingly, energy efficient tempering of air being supplied to the space 32 is provided. In certain instances the pressure relief valve 174 may or may not be required.

It should be apparent to one who is of skill in the art that the repositioning of reversing valve 136 and valves 146, 170, in addition to reconfiguring the system for a different mode, also causes fluctuations/surges as some residual pressure differentials undoubtedly exist in the system.

Accordingly, what is needed in the art is a device that prevents unwanted refrigerant flow during heat exchanger control valve transition or the heating mode.

SUMMARY

To address the above-discussed deficiencies of the prior art, the present invention provides, in one aspect, a vapor-compression air conditioning system comprising a blower positioned in a return air flow path from a conditioned space, a reheat heat exchanger positioned in the return air flow path and downstream from the blower, a system reversing valve fluidly coupled to the reheat heat exchanger, and a refrigerant flow sequencer interposed the system reversing valve and the reheat heat exchanger. A method of manufacturing an air conditioning system is also provided.

The foregoing has outlined features of the present invention so that those skilled in the pertinent art may better understand the detailed description of the invention that follows. Additional features of the invention will be described hereinafter that form the subject of the claims of the invention. Those skilled in the pertinent art should appreciate that they can readily use the disclosed conception and specific embodiment as a basis for designing or modifying other structures for carrying out the same purposes of the present invention. Those skilled in the pertinent art should also realize that such equivalent constructions do not depart from the spirit and scope of the invention.

BRIEF DESCRIPTION

For a more complete understanding of the invention, reference is now made to the following descriptions taken in conjunction with the accompanying drawings, in which:

FIG. 1 illustrates a conventional vapor-compression type air conditioning system with enhanced dehumidification accessory as disclosed in U.S. Pat. No. 6,826,921;

DETAILED DESCRIPTION

Figure 1:
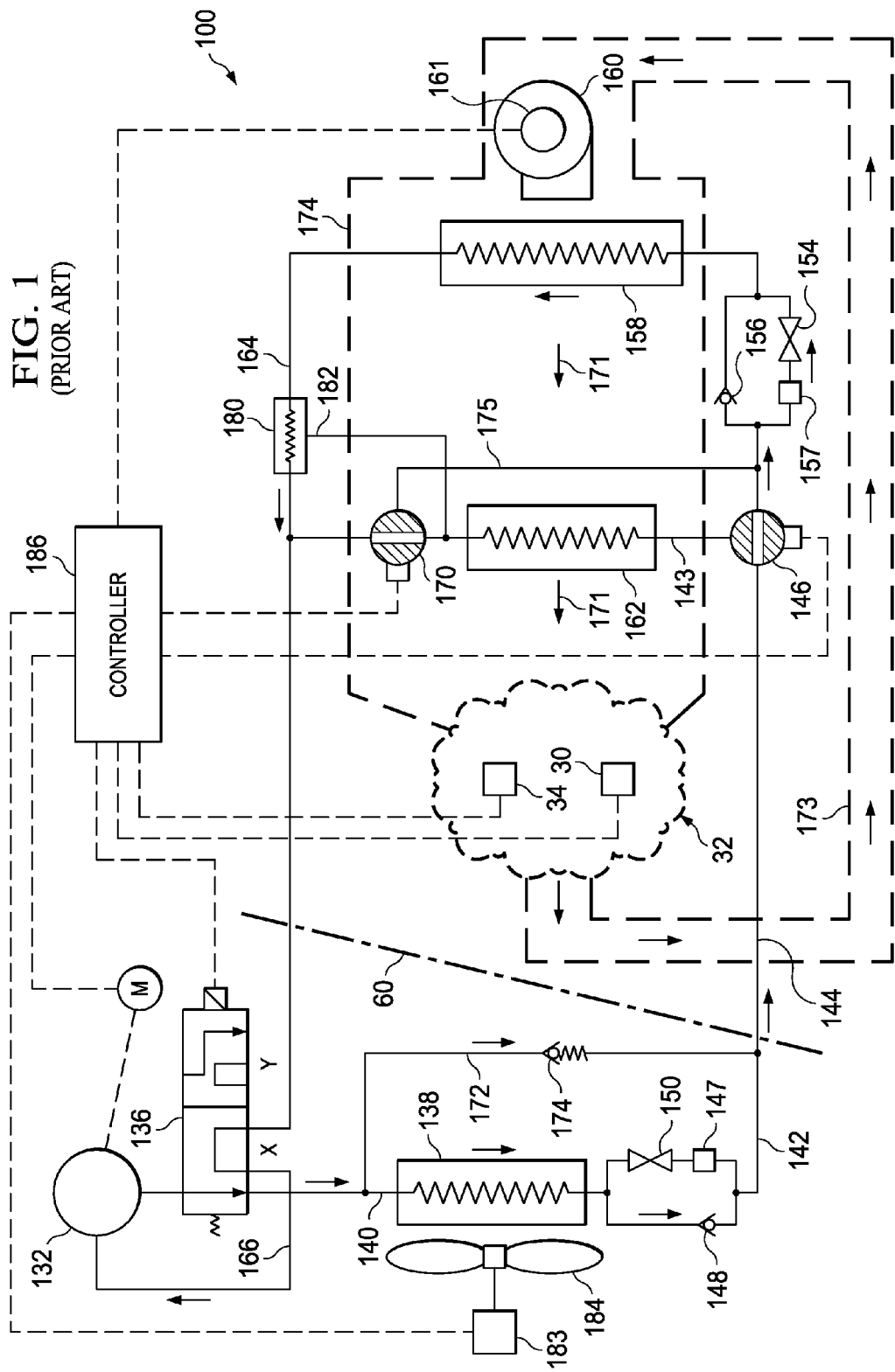
Figure 2:
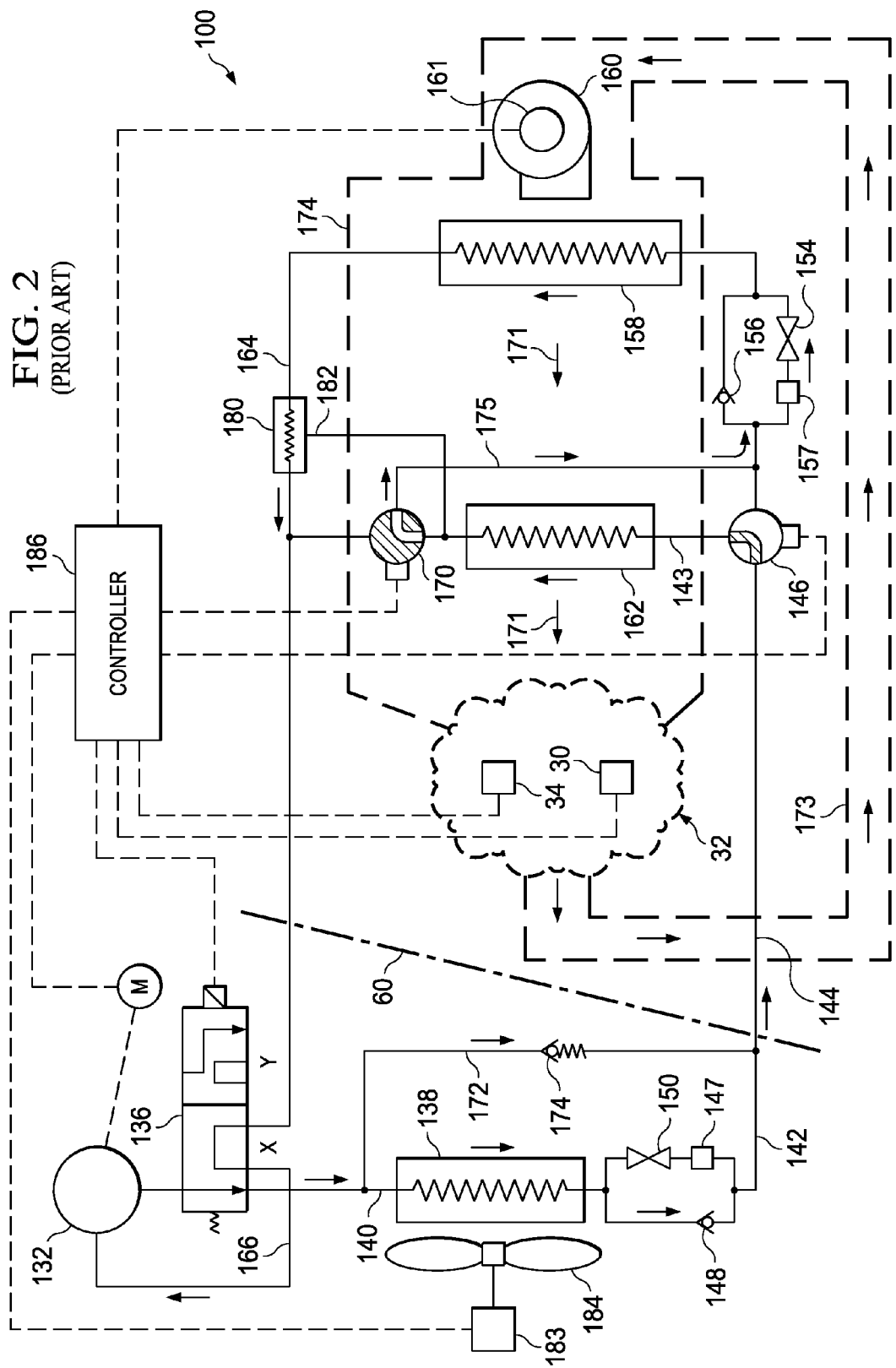
FIG. 2 illustrates the conventional heat pump system of FIG. 1 in cooling mode with enhanced dehumidification engaged.
Figure 3:
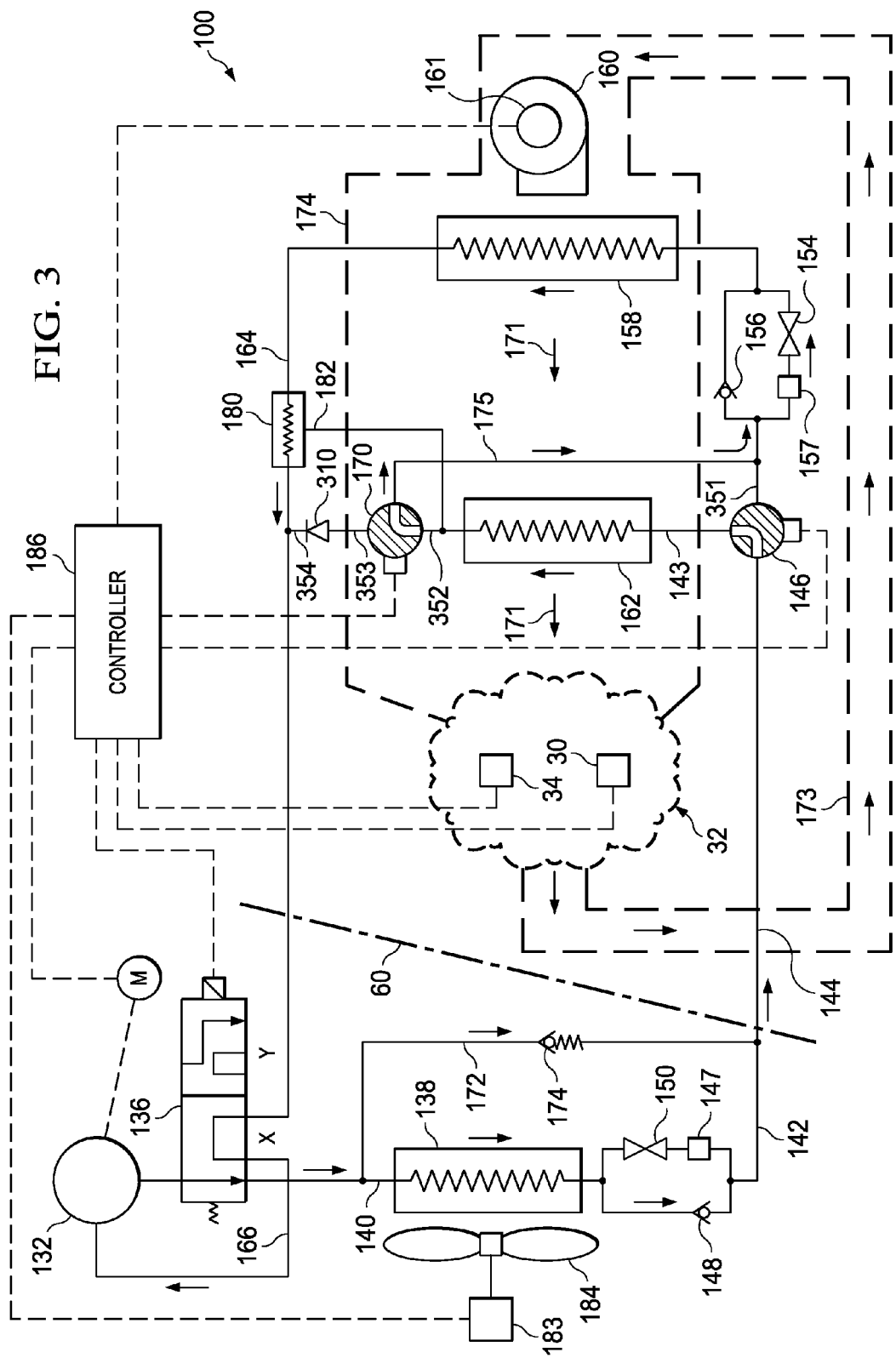
FIG. 3 illustrates one embodiment of a heat pump system with the addition of a refrigerant flow sequencer constructed in accordance with the present invention.

Referring now to FIG. 3, illustrated is one embodiment of a heat pump system 300 with the addition of a refrigerant flow sequencer 310 constructed in accordance with the present invention. The heat pump system 300 is shown in cooling mode with enhanced dehumidification. System components that replicate system components of FIG. 1 are identified with the same reference numbers as in FIG. 1. Refrigerant flow sequencer 310 is interposed valve 170 and conduit 164. For ease of understanding and discussion, additional conduits are hereby specified as: conduit 351 interposed valve 146 and dryer 157; conduit 352 interposed reheat heat exchanger 162 and valve 170; conduit 353 interposed valve 170 and refrigerant flow sequencer 310; and conduit 354 interposed valve 170 and conduit 164.

Specifically, when valves 146 and 170 are repositioned to change from one configuration to another, all three ports of each valve are open to one another during the valve transition. That is, when valve 146 is repositioned conduits 144, 143 and 351 are all, at least momentarily, open to one another. In like manner, when valve 170 is repositioned conduits 352, 175 and 353 are all, at least momentarily, open to one another. Thus, pressure differences between the respective conduits may cause undesirable refrigerant flow. Specifically, in some situations repositioning of valve 170 can cause undesirable compressor flooding. Additionally, it was learned during early testing with heat pumps that pressure and temperature conditions were established in the system during heating mode that made it possible for refrigerant to migrate to the charge compensator 180 and to the reheat coil 162. This resulted in the system behaving as if it were undercharged during the heating mode.

Figure 4:
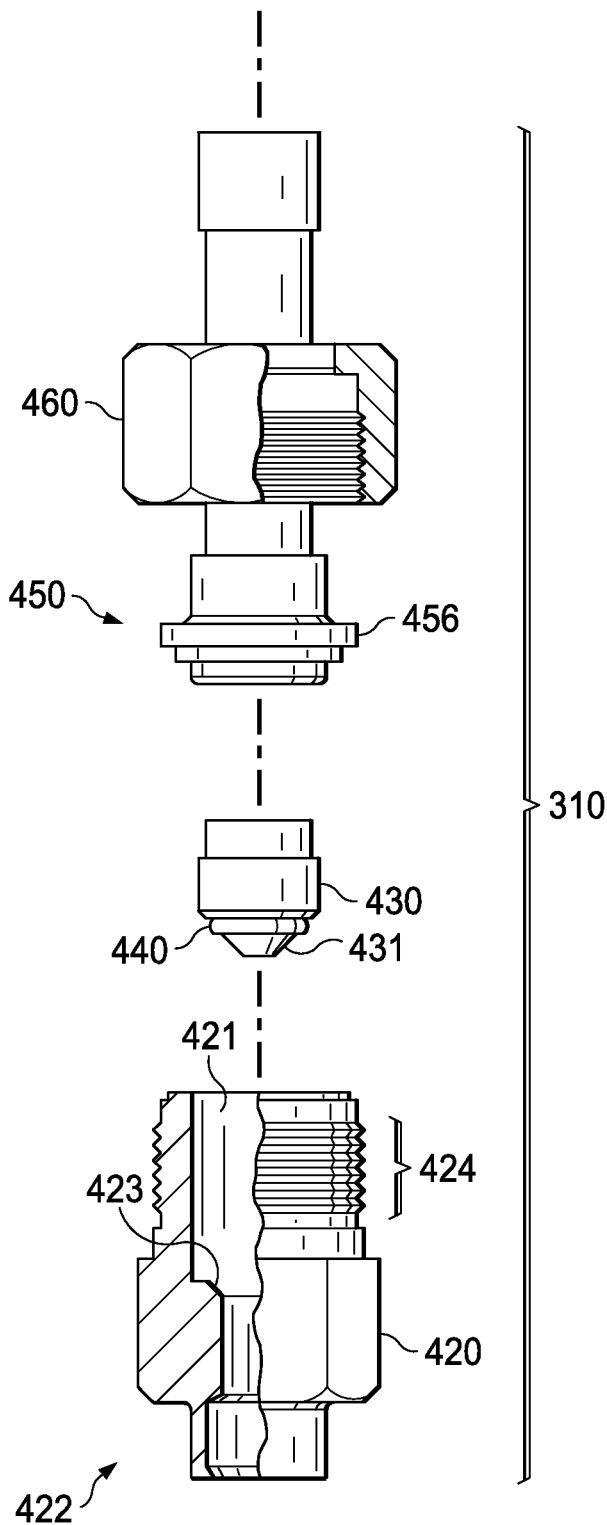
FIG. 4 illustrates an exploded partial sectional view of one embodiment of the refrigerant flow sequencer of FIG. 3.

Referring now to FIG. 4, illustrated is an exploded partial sectional view of one embodiment of the refrigerant flow sequencer 310 of FIG. 3. The refrigerant flow sequencer 410 comprises a sequencer shell body 420, a flow restrictor 430, an O-ring 440, a piston retainer 450 and a tubing nut 460. In a preferred embodiment, the flow restrictor 430 is slidably positionable within a cavity 421 of the sequencer shell body 420. The shell body 420 has a first end 422 coupleable to conduit 353 (See FIG. 3) and to the reheat heat exchanger 162, in turn. The shell body 420 has an internal taper 423 that is substantially equal to an external taper 431 of the flow restrictor 430. The O-ring 440 is positioned around the external taper 431 of the flow restrictor 430. It should be noted that the flow restrictor 430 is devoid of any through aperture as may be found in conventional flow restrictors. The piston retainer 450 is coupled to conduit 354 (See FIG. 3) and conduit 164, in turn. The piston retainer 450 has a collar 456 that is captured by the tubing nut 460 that couples to a male thread 424 of the shell body 420.

The flow restrictor 430 slides within the shell body 420 as dictated by differences in pressure between conduit 353 and conduit 354. These differences can occur during a change in position of the valve 170. When pressure in conduit 353 exceeds pressure in conduit 354, the flow restrictor 430 slides toward the piston retainer 450 and refrigerant flows around the external taper 431 and the O-ring 440 to enter conduit 354 and conduit 164 in turn. The difference between the outer diameter of the flow restrictor 430 and the inner diameter of cavity 421 is on the order of 0.001" to 0.002". Similarly, when pressure in conduit 354 exceeds pressure in conduit 353, the flow restrictor 430 slides toward the internal taper 423. The flow restrictor 430 thus effectively seals the conduit 352 with the O-ring 440 on the internal taper 423 and refrigerant ceases to flow to conduit 353.

Thus, a refrigerant flow sequencer 310 has been described that acts as a check valve when heat pump system pressures try to establish flow from line 164 to valve 170 and reheat heat exchanger 162. Furthermore, the refrigerant flow sequencer 310 acts as a flow limiting device when the valves 164 and 170 are in transition from cooling to reheat modes.

Although the present invention has been described in detail, those skilled in the pertinent art should understand that they can make various changes, substitutions and alterations herein without departing from the spirit and scope of the invention in its broadest form.

What is claimed is:

1. A vapor-compression type air conditioning system configured as a bi-directional heat pump, comprising:
    a blower positioned in a return air flow path from a conditioned space;
    a reheat heat exchanger positioned in said return air flow path and downstream from said blower;
    a system reversing valve fluidly coupled to said reheat heat exchanger;
    a refrigerant flow sequencer interposing said system reversing valve and said reheat heat exchanger, wherein said refrigerant flow sequencer includes:
        a flow restrictor retainer coupleable to a first refrigerant tube and having a longitudinal cavity therethrough having an internal diameter, said flow restrictor retainer having a circular collar and an annular shoulder around an end of said longitudinal cavity;
        a sequencer shell body coupleable to said flow restrictor retainer and to a second refrigerant tube, said sequencer shell body having a shell body cavity therein;
        a flow restrictor slidably captured between said flow restrictor retainer and said sequencer shell body, said flow restrictor having first and second ends and a midsection, said first end substantially cylindrical in form and of lesser diameter than said midsection, said midsection having an outer diameter equal to or greater than said internal diameter of said longitudinal cavity, and said second end having an external taper; and
        an O-ring coupled to said flow restrictor around said external taper.

2. The air conditioning system as recited in claim 1 wherein said flow restrictor is slidable within said shell body cavity between a restricted flow position with said midsection in contact with said annular shoulder and a closed valve position with said O-ring in contact with said sequencer shell body.

3. The air conditioning system as recited in claim 1 wherein said sequencer shell body has an internal taper and a first end coupleable to said reheat heat exchanger.

4. The air conditioning system as recited in claim 3 wherein said external taper substantially matches said internal taper.

5. The air conditioning system as recited in claim 1 wherein said flow restrictor is devoid of any through orifice.

6. The air conditioning system as recited in claim 1 further comprising a heat exchanger control valve interposed said reheat heat exchanger and said refrigerant flow sequencer.

7. The air conditioning system as recited in claim 1 further comprising a refrigerant fluid conduit coupled to said system reversing valve and said refrigerant flow sequencer, said refrigerant flow sequencer further coupled to said reheat heat exchanger.

8. The air conditioning system as recited in claim 7 wherein said flow restrictor retainer is coupled to said refrigerant fluid conduit and coupleable to said reheat heat exchanger.

9. The air conditioning system as recited in claim 8 further comprising a tubing nut positioned around said flow restrictor retainer and coupleable to said sequencer shell body.

10. A method of manufacturing an air conditioning system configured as a bi-directional heat pump, comprising:
    positioning a blower in a return air flow path from a conditioned space;
    positioning a reheat heat exchanger in said return air flow path and downstream from said blower;
    fluidly coupling a system reversing valve to said reheat heat exchanger;
    interposing a refrigerant flow sequencer between said system reversing valve and said reheat heat exchanger, wherein said refrigerant flow sequencer includes:
        a flow restrictor retainer coupleable to a first refrigerant tube and having a longitudinal cavity therethrough having an internal diameter, said flow restrictor retainer having a circular collar and an annular shoulder around an end of said longitudinal cavity;

a sequencer shell body coupleable to said flow restrictor retainer and to a second refrigerant tube, said sequencer shell body having a shell body cavity therein;

a flow restrictor slidably captured between said flow restrictor retainer and said sequencer shell body, said flow restrictor having first and second ends and a midsection, said first end substantially cylindrical in form and of lesser diameter than said midsection, said midsection having an outer diameter equal to or greater than said internal diameter of said longitudinal cavity, and said second end having an external taper; and coupling an O-ring to said flow restrictor around said external taper.

11. The method as recited in claim 10 wherein said flow restrictor is slidable within said shell body cavity between a restricted flow position with said midsection in contact with said annular shoulder and a closed valve position with said O-ring in contact with said sequencer shell body.

12. The method as recited in claim 10 wherein said sequencer shell body has an internal taper and a first end coupleable to said reheat heat exchanger.

13. The method as recited in claim 12 wherein said external taper substantially matches said internal taper.

14. The method as recited in claim 10 wherein said flow restrictor is devoid of any through orifice.

15. The method as recited in claim 10 further comprising interposing a heat exchanger control valve between said reheat heat exchanger and said refrigerant flow sequencer.

16. The method as recited in claim 10 further comprising coupling a refrigerant fluid conduit to said system reversing valve and said refrigerant flow sequencer, and further coupling said refrigerant flow sequencer to said reheat heat exchanger.

17. The method as recited in claim 16 further comprising coupling said flow restrictor retainer to said refrigerant fluid conduit wherein said flow restrictor retainer is coupleable to said reheat heat exchanger.

18. The heat pump system as recited in claim 17 further comprising positioning a tubing nut around said flow restrictor retainer, wherein said tubing nut is coupleable to said sequencer shell body.

* * * * *